US012566836B1

(12) United States Patent
Russell et al.

(10) Patent No.: US 12,566,836 B1
(45) Date of Patent: Mar. 3, 2026

(54) INTERNET OF THINGS DEVICE BASED AUTHENTICATION

(71) Applicant: United Services Automobile Association (USAA), San Antonio, TX (US)

(72) Inventors: Christopher Russell, San Antonio, TX (US); Emily Kathleen Krebs, San Antonio, TX (US); Jose L. Romero, Jr., San Antonio, TX (US); Reynaldo Medina, III, San Antonio, TX (US); Andre Rene Buentello, San Antonio, TX (US); Noe Alberto Martinez, San Antonio, TX (US); Cayley Danielle Collum, San Antonio, TX (US); Ryan Thomas Russell, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 4 days.

(21) Appl. No.: 18/463,215

(22) Filed: Sep. 7, 2023

Related U.S. Application Data

(63) Continuation of application No. 16/825,925, filed on Mar. 20, 2020, now Pat. No. 11,783,021.

(Continued)

(51) Int. Cl.
    *G06F 21/40*     (2013.01)
    *G16Y 10/75*     (2020.01)
    (Continued)

(52) U.S. Cl.
    CPC ............... *G06F 21/40* (2013.01); *G16Y 10/75* (2020.01); *G16Y 40/35* (2020.01); *H04L 12/2818* (2013.01)

(58) Field of Classification Search
    CPC ........ G06F 21/40; G16Y 10/75; G16Y 40/35; H04L 12/2818; H04L 12/2829
    See application file for complete search history.

(56) References Cited

U.S. PATENT DOCUMENTS 11,140,158 B1 * 10/2021 Adam .................... H04L 67/34
2016/0005038 A1 * 1/2016 Kamal ............... G06Q 20/3223
                                         705/44

(Continued)

FOREIGN PATENT DOCUMENTS

CN        108932420 A    12/2018

OTHER PUBLICATIONS

U.S. Appl. No. 16/825,925, filed Mar. 20, 2020, Internet of Things Device Based Authentication.

(Continued)

*Primary Examiner* — Zhensheng Zhang
(74) *Attorney, Agent, or Firm* — Perkins Coie LLP

(57) ABSTRACT

Internet-of-Things (IoT) devices can be used to perform authentication related operations because IoT devices are prevalent in our society and because a server performing an authentication operation can communicate with IoT devices via the Internet. In a first example authentication technique, a server determines whether a person can perform an operation requested by the person based on whether the person performed an action on an IoT device, where the action is selected by the server and send to the person's user device. In a second example authentication technique, a server determines whether a person can perform an operation based on whether a person accurately identified an action performed by an IoT device, where the IoT device performs the action based on a command sent by the server.

18 Claims, 5 Drawing Sheets

Related U.S. Application Data

(60) Provisional application No. 62/821,812, filed on Mar. 21, 2019.

(51) Int. Cl.
_G16Y 40/35_ (2020.01)
_H04L 12/28_ (2006.01)

(56) References Cited

U.S. PATENT DOCUMENTS

| | | | | |
|---|---|---|---|---|
| 2017/0034145 A1* | 2/2017 | Shimazaki | ............ | G06F 21/608 |
| 2018/0027220 A1* | 1/2018 | Hailpern | ............... | H04M 3/567 |
| | | | | 348/177 |
| 2018/0027413 A1* | 1/2018 | Hanley | ............ | G06Q 20/40145 |
| | | | | 726/7 |

OTHER PUBLICATIONS

U.S. Appl. No. 62/821,812, filed Mar. 21, 2019, Internet of Things Device Based Authentication.

* cited by examiner

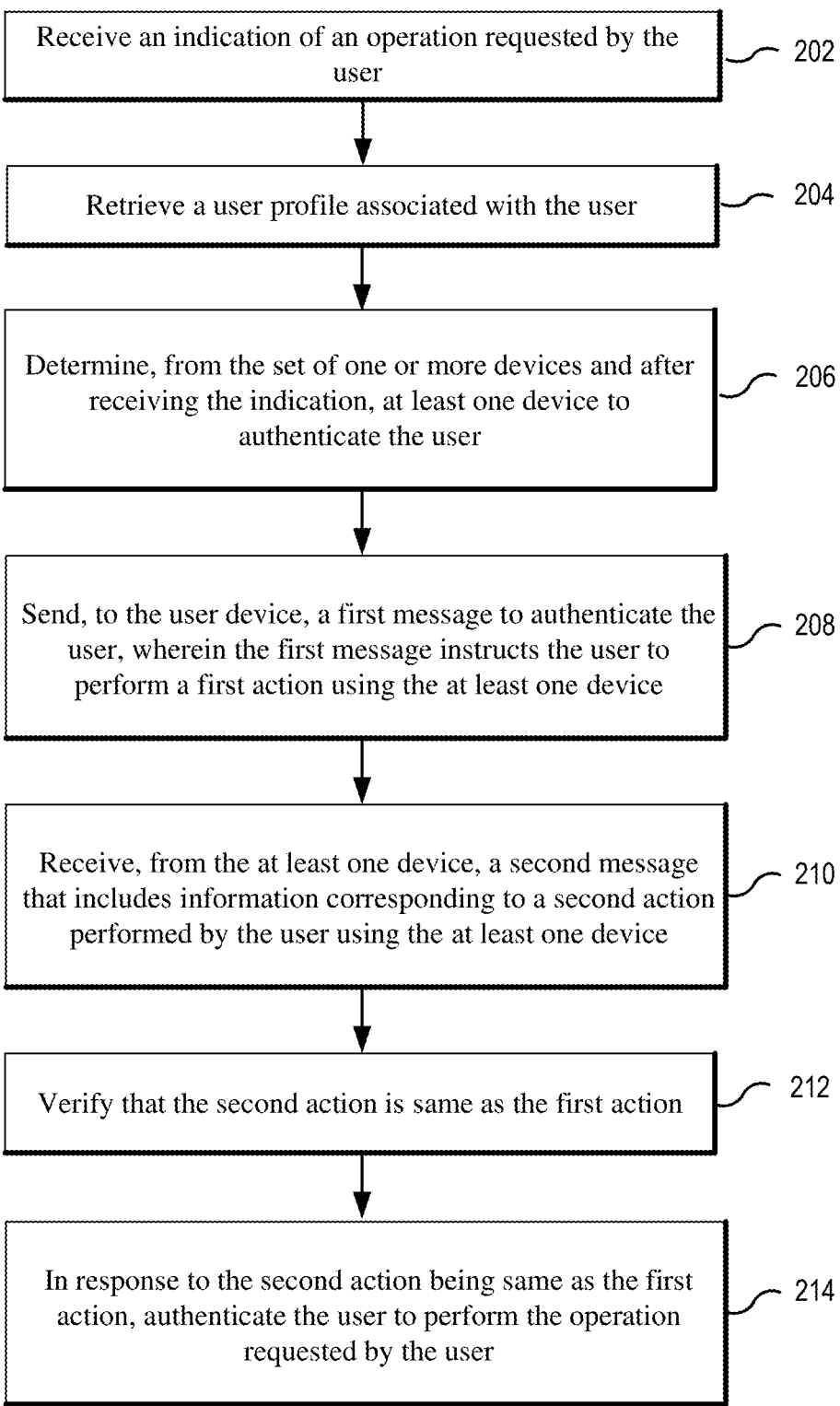

Receive an indication of an operation requested by the user ⌐~ 202

Retrieve a user profile associated with the user ⌐~ 204

Determine, from the set of one or more devices and after receiving the indication, at least one device to authenticate the user ⌐~ 206

Send, to the user device, a first message to authenticate the user, wherein the first message instructs the user to perform a first action using the at least one device ⌐~ 208

Receive, from the at least one device, a second message that includes information corresponding to a second action performed by the user using the at least one device ⌐~ 210

Verify that the second action is same as the first action ⌐~ 212

In response to the second action being same as the first action, authenticate the user to perform the operation requested by the user ⌐~ 214

*FIG. 2*

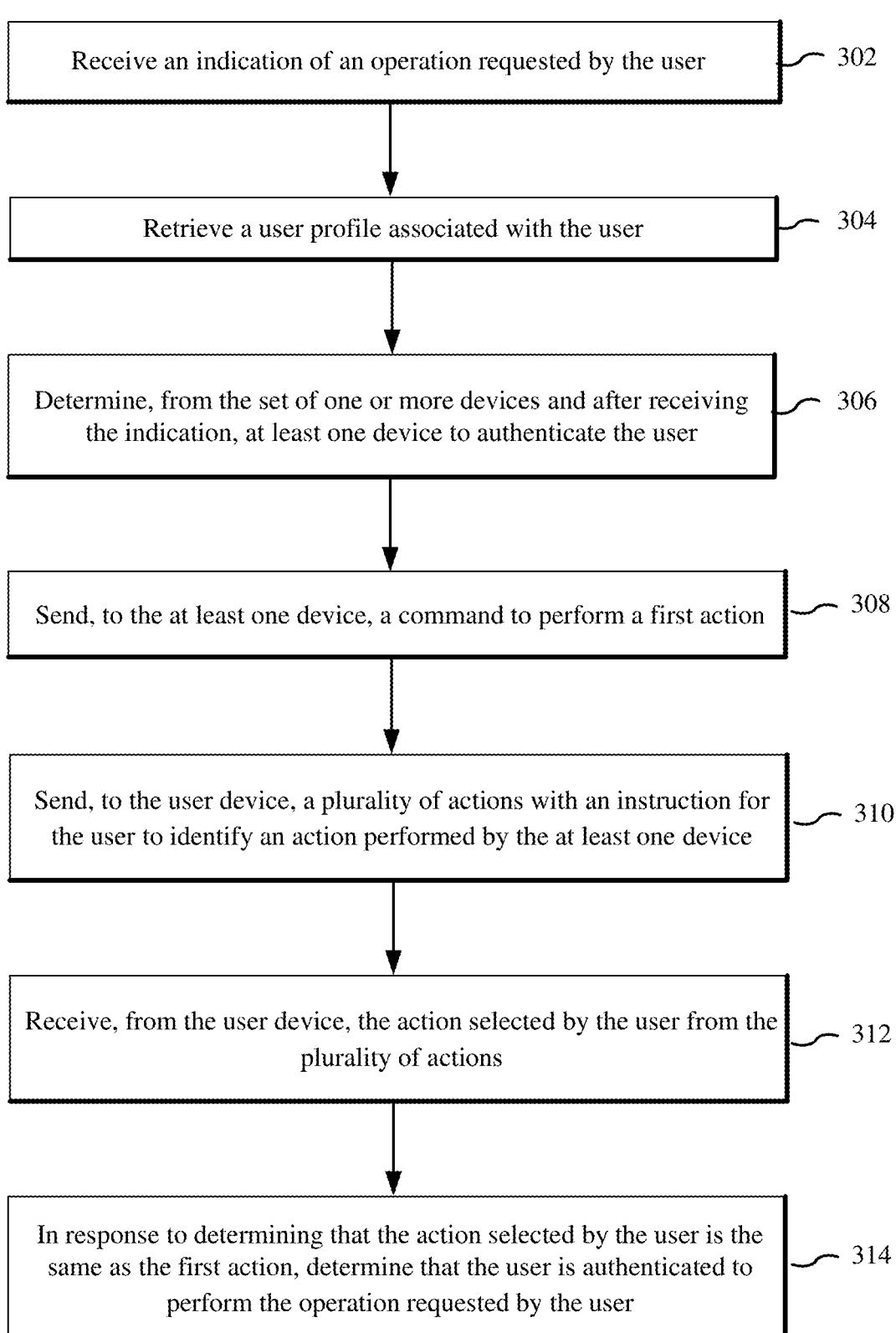

Receive an indication of an operation requested by the user — 302

Retrieve a user profile associated with the user — 304

Determine, from the set of one or more devices and after receiving the indication, at least one device to authenticate the user — 306

Send, to the at least one device, a command to perform a first action — 308

Send, to the user device, a plurality of actions with an instruction for the user to identify an action performed by the at least one device — 310

Receive, from the user device, the action selected by the user from the plurality of actions — 312

In response to determining that the action selected by the user is the same as the first action, determine that the user is authenticated to perform the operation requested by the user — 314

*FIG. 3*

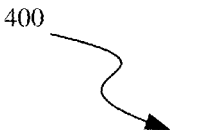
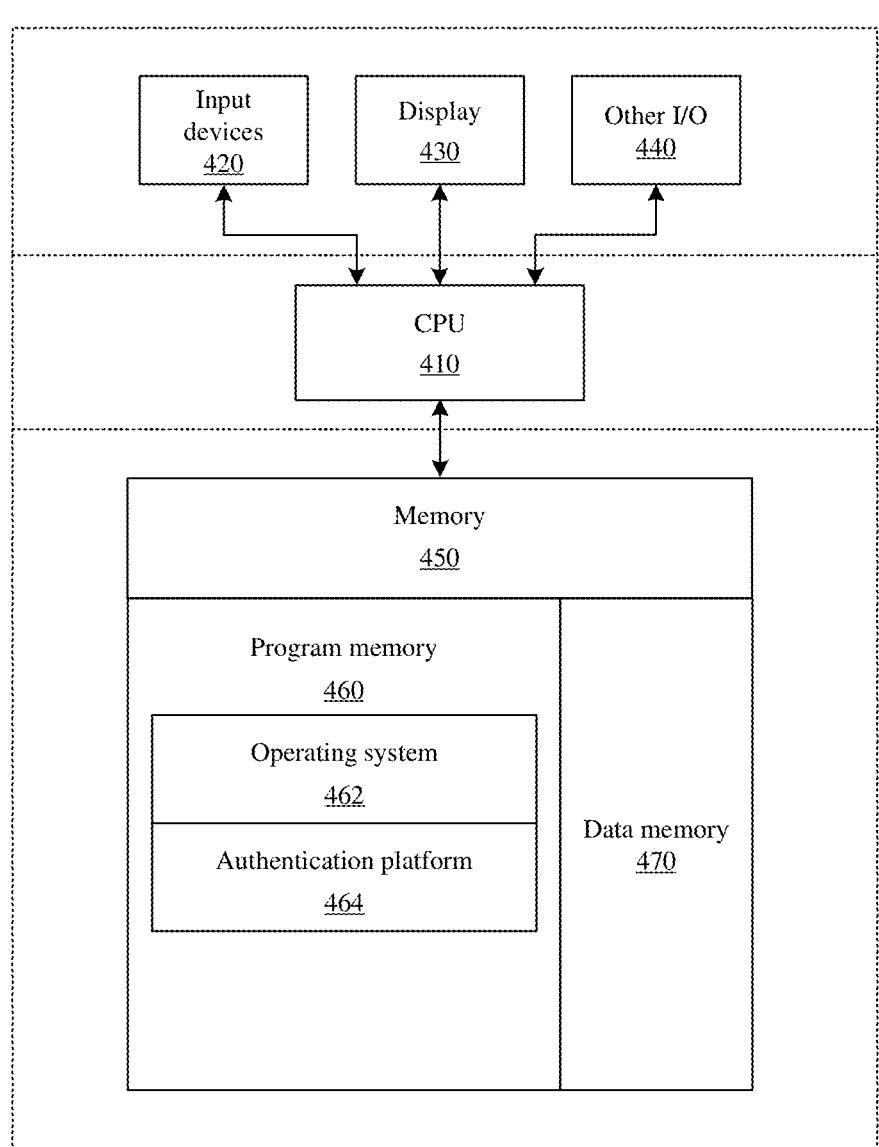
*FIG. 4*

INTERNET OF THINGS DEVICE BASED AUTHENTICATION

CROSS-REFERENCE TO RELATED APPLICATIONS

This application is a continuation of U.S. patent application Ser. No. 16/825,925 filed Mar. 20, 2020, now allowed, which is a non-provisional of and claims priority to U.S. Provisional Application No. 62/821,812, filed on Mar. 21, 2019, entitled "INTERNET OF THINGS DEVICE BASED AUTHENTICATION," all of which are hereby incorporated by reference in their entireties for all purposes.

BACKGROUND

The prevalence of Internet-of-Things (IoT) devices has changed the way people interact with technology and the way people operate their lives. A home can include many Internet connected devices such as lights, doorbell, thermostat, security system, and/or lock. An Internet connected vehicle can be considered an IoT device that can communicate with another IoT device via the Internet. Thus, an Internet connected car can automatically request an Internet connected garage door to open when the car determines that it is within a certain distance of a destination. Similarly, a phone can be considered an IoT device that can obtain information from or send information to an IoT device. For example, if a person has left his or her house but cannot remember whether the Internet connected garage door has been closed, the person can use his or her phone to obtain this information and can even close the garage door via the phone.

BRIEF DESCRIPTION OF THE DRAWINGS

FIG. 2 shows an example flow diagram of an example authentication technique.

FIG. 3 shows an example flow diagram of another example authentication technique.

FIG. 4 is a block diagram illustrating an overview of devices on which some implementations of the disclosed technology can operate.

Figure 1A:
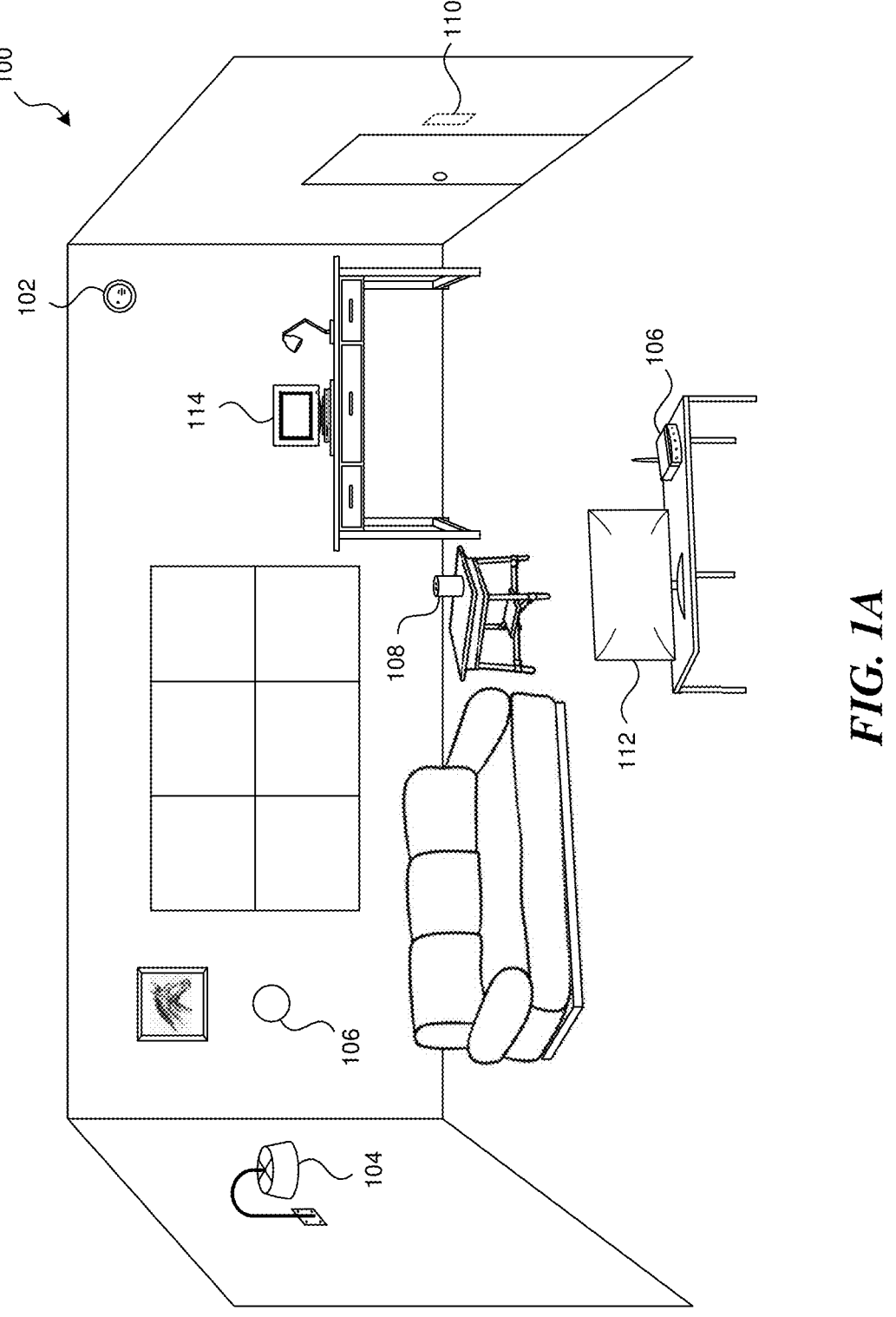
FIG. 1A shows an example room or an area that includes multiple Internet-of-Things (IoT) devices.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Internet-of-Things (IoT) devices can be used to perform authentication related operations because at least one IoT device can be found in a person's home, office, and/or vehicle and because a server performing an authentication operation can communicate with IoT devices via the Internet. This patent document describes at least two example authentication techniques to determine whether a person is authenticated to perform a sensitive operation requested by the person. A "sensitive operation" may include an operation for which an authentication should be performed to determine whether a person requesting the operation is authorized to perform that operation. Some examples of sensitive operation include accessing a mobile application, performing a bank wire-transfer via a website, engaging in a phone call or a web chat regarding a person's account or potential products for the person, or requesting sensitive personal information about a bank account.

In a first example of an authentication technique, an organization can authenticate a user by sending the user a request to take an action related to one of the user's IoT devices and then monitoring data from the IoT device to verify that the user took the requested action. Some examples of an action performed on an IoT device may include a person opening and then closing an Internet connected garage door, a person unlocking and then locking an Internet connected home lock, or a person speaking a command to an Internet connected home speaker. If a server determines that a person has performed an action on an IoT device based on an instruction provided to that person, then the server can allow the person to perform an operation requested by the person. In some implementations, the data can be further analyzed to authenticate the user or authenticate the user to a higher level. For example, if the user speaks a command into an Internet connected home speaker or stands in front of his or her video-collecting doorbell, voice biometrics or facial recognition, respectively, could be used to further authenticate the user.

In a second example of an authentication technique, an organization can authenticate the user by a server of the organization sending a command to one of the user's IoT devices and asking the user to identify the command that was sent. Some examples of an action performed by an IoT device may include a server instructing an Internet connected door to open and then close, a server instructing an Internet connected lock to unlock and then lock, or a server instructing an Internet connected light bulb to turn off and then turn on. In this example, if a server determines that a person has accurately identified an action performed by an IoT device, then the server can allow the person to perform an operation requested by the person.

FIG. 1A shows an example room or an area that includes multiple IoT devices. The room 100 may be a part of a home or an office. The room 100 includes the following IoT devices: smoke and/or carbon monoxide sensor 102, a light bulb 104, a thermostat 106, a home speaker 108, a doorbell 110, a television 112, and/or a computer 114. Any one or more of these IoT devices can access the Internet via a cellular service or via Wi-Fi and/or Bluetooth using a router 106. Furthermore, one or more of these IoT devices can be used to determine whether a person is authenticated to perform a sensitive operation. For example, the authentication techniques described in this patent document can authenticate a person who wants to perform a sensitive operation via a user device such as a computer 114 or a mobile device.

Figure 1B:
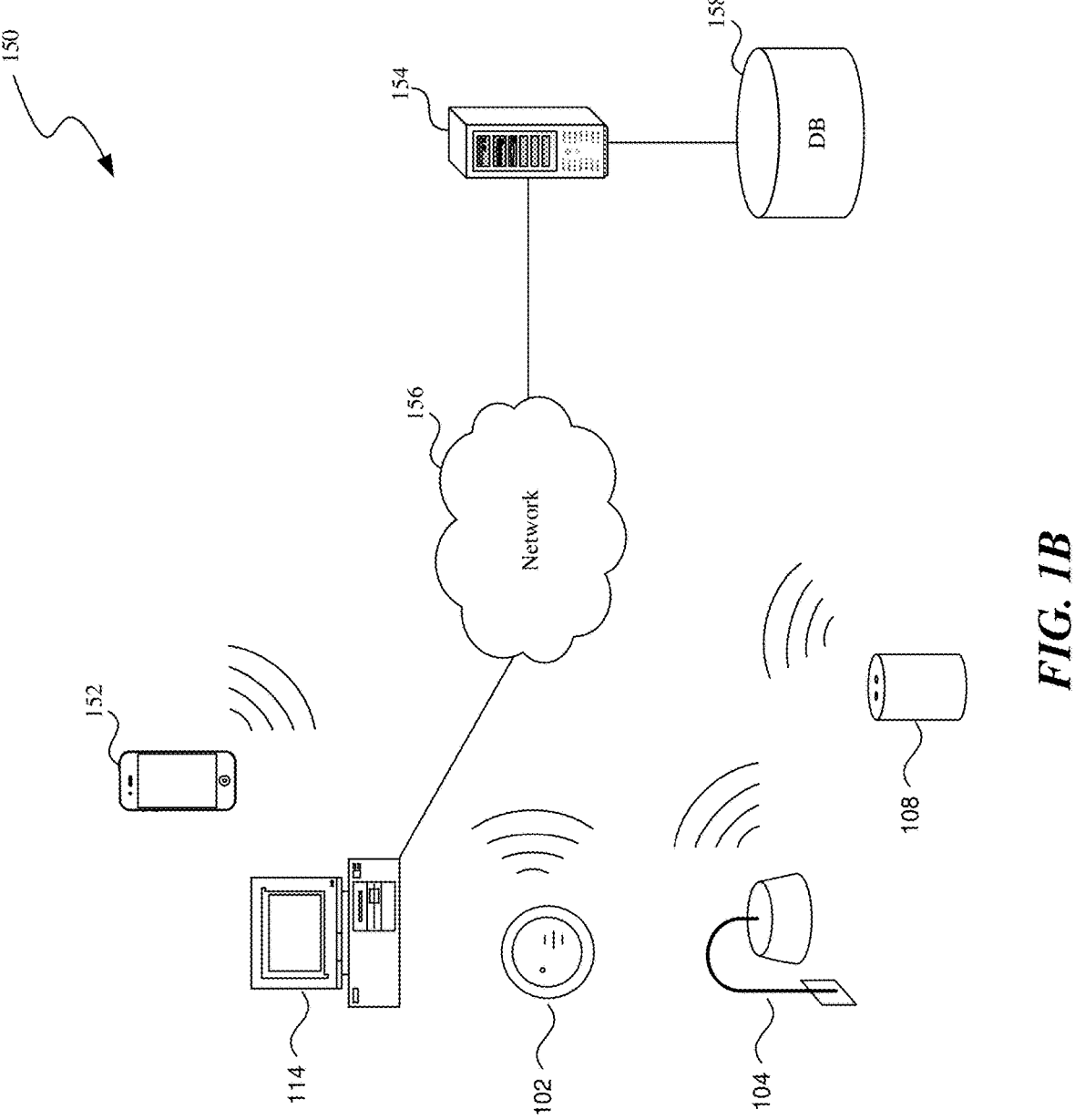
FIG. 1B shows a block diagram of a system for authenticating a user using an IoT device.

FIG. 1B shows a block diagram of a system for authenticating a user using an IoT device. The authentication system 150 shows at least some of the IoT devices shown in FIG. 1A. One or more IoT devices such as a smoke and/or carbon monoxide sensor 102, a light bulb 104, a home speaker 108, a computer 114, and/or a mobile device 152 can communicate with an authentication server 154 via a network 156. The authentication server 154 can include at least one processor and a memory having instructions stored thereupon. The instructions upon execution by the processor configure the authentication server 154 to perform at least the first and second authentication techniques described in this patent document. This patent document describes operations performed by the authentication server 154, which may be performed by a single server or by multiple servers in communication with each other via the network 156.

A first example authentication technique includes an authentication server 154 determining whether a person can perform an operation requested by the person based on whether the person performed an action on an IoT device, where the action is selected by the authentication server 154 and send to the person's user device. The first authentication technique includes an authentication server 154 receiving an indication of an operation requested by the user. The operation may include a sensitive operation such as requesting to perform a financial transaction or requesting user account related information. The authentication server 154 can receive the indication from a user device 114 or 152 associated with the user. A user device may indicate a user's request to perform an operation in different scenarios. For example, the indication may include a user clicking on a link on a website via a user device to indicate that he or she wants to perform an operation associated with that link, or the indication may include a user selecting a number on a phone or speaking a selection into a phone to indicate that he or she wants to perform a selected operation.

The authentication server 154 is in communication with a database 158 from which the authentication server 154 can retrieve a user profile associated with the user. The authentication server 154 can retrieve the user profile based on device information (e.g., phone number, device fingerprint) login information or an account information provided by the user. The user profile can include a set of one or more IoT devices previously registered with the user. In some embodiments, the user can also provide an accessibility record that can be stored in the user profile. The accessibility record includes a list of feature(s) or action(s) related to IoT device(s) that can be performed by the user to authenticate the user. Thus, by having an accessibility record not list a feature of an IoT device, a user can indicate that that feature is not accessible to a user for authentication or that an action cannot be performed by the user. For example, if a user has hearing impairment but not visual impairment, the accessibility record can indicate that a light bulb IoT device can be used to perform a visual authentication as described in this patent document. The accessibility record can indicate, for example, hearing, vision, cognitive, and/or mobility impairments that can provide the authentication server with information as to the types of authentication that are available to authenticate the user.

A user may register an IoT device with the authentication server 154 to indicate that the IoT device is affiliated with the user. A registration process may include a user accessing his or her user profile via the authentication server 154 and adding one or more IoT devices that are associated with the user. By adding an IoT device to a user profile, the authentication server 154 can determine an address (e.g., Internet Protocol (IP) address) to communicate with the IoT device. Furthermore, the authentication server 154 can determine the number of actions that can be performed by the IoT device. For example, if a user added a light bulb 104 to his or her user profile, the authentication server 154 can determine the following example actions performed by the light bulb 104: turning on the light bulb, turning off the light bulb, or repeatedly turning on and off the light bulb for a predetermined duration (e.g., 5 seconds). In another example, if a user added a home speaker 108 to his or her user profile, the authentication server 154 can determine the following example actions performed by the home speaker 108: playing music, informing a user of the weather for the day, or providing definition of a random word. Registering the IoT device can also provide the authentication server 154 with access to monitor data from the IoT device, and in some embodiments, to control the IoT device.

In some embodiments, as part of the registration process, a user can create a list of the types of authentication that can be accessible to the user, where the list is stored in an accessibility record. Based on accessibility records in the user profile, the authentication server 154 can select the types of authentication that may be performed accordingly. Several examples are provided below to further explain the authentication feature based on accessibility records.

In a first example, if an accessibility record for a user indicates that the user can perform authentication using visual cues, the authentication server 154 can use, for example, a light bulb IoT device or an IoT device with an indicator light for authentication. In this example, another IoT device with a camera (e.g., laptop, webcam, IoT camera) may be able to watch for a particular pattern or sequence of light produced by the IoT device. This process could be repeated periodically to ensure that the device is still correctly associated with the user. By repeating the process without user intervention, the authentication server 154 can ensure continuous authentication of the devices in a house or room.

In a second example, if an accessibility record for a user indicate that the user can perform authentication using audio cues, the authentication server 154 can use, for example, an IoT device with a speaker or an IoT alarm device for authentication. In this example, another IoT device with vibration sensor(s) and/or microphone(s) may be used to detect a pattern or sequence of audio produced by the IoT device. As an example, the IoT detection devices may include a phone's microphone and/or the accelerometer, or a laptop's microphone and/or other sensors (e.g., disk drive drop protection or acoustic protection sensors).

For a user who is vision and hearing impaired, an action such as flipping a switch along with a pattern vibrating on their phone or alarm may be used for authentication, and such action(s) can be indicated in the user's accessibility record. In some embodiments, windows or doors can be opened if IoT sensors are located on windows or doors. In some embodiments, an IoT smoke detectors can detect light (or light pulse(s)) projected onto the smoke detector. In some embodiments, a user can draw on a mobile device or on paper a drawing and then show that drawing on an IoT device with a camera for authentication. In such an embodiment, the authentication server 154 can receive from the IoT device with the camera an image of the drawing and determine if the drawing matches a drawing requested by the authentication server 154 from the user.

After the authentication server 154 receives an indication of an operation requested by the user and after the authentication server 154 obtains the user's user profile, the authentication server 154 can determine, from the set of one or more IoT devices, at least one IoT device to authenticate the user. In some embodiments, the at least one IoT device is determined based on user preference or based on a communication status between the authentication server 154 and the at least one IoT device. For example, during the registration process where one or more IoT devices are added to the user profile, a user may indicate that the thermostat 106 and smoke and/or carbon monoxide alarm 102 should not be used for authentication purposes. In another example, the authentication server 154 may periodically ping or may periodically receive information from one or more IoT devices to determine which of the one or more IoT devices are available to perform the authentication.

Next, the authentication server 154 sends, to the user device, a first message to authenticate the user, where the first message instructs the user to perform a first action using the at least one device. The user device displays the first message to the user so that the user can perform the first action. Some examples of the first action includes turning on or off the light bulb 104 or television 112, sending a command to the garage door to open/close, sending a command to a home speaker 108 to play music or provide a weather report, sending a command to lock/unlock a vehicle, increasing or decreasing a temperature on a thermostat 106, increasing or decreasing an intensity of light on the light bulb 104, or removing an item (e.g., milk carton) from a refrigerator. In some embodiments, the authentication server 154 may generate the first message by selecting one or more actions that can be performed by the determined IoT device. In some other embodiments, the authentication server 154 may obtain from the database 158, the first message may be pre-generated to include one or more actions that can be performed by the determined IoT device. As mentioned above, the authentication server 154 can determine one or more actions that can be performed by an IoT device during the IoT device registration process.

In some embodiments, the first message comprises an option for the user to perform the first action using a first IoT device or a third action using a second IoT device. The first IoT device and the second IoT device are included in the set of one or more devices in the user profile. In such embodiments, the information included in the second message can indicate a selection of the first action. Furthermore, in such embodiments, the first action and the third action can be arranged in an order based on a level of interaction required by the user with the first device and the second device, respectively. The first and third actions are displayed on the user device based on the arranged order. A benefit of arranging the first and third actions based on a level of interaction is that it can easily indicate to the user the action(s) that require the least effort and the action(s) that require the most effort. For example, turning on or off the light bulb 104 may require less effort on the part of the user compared to having the user ring the doorbell 110 to have the user's picture taken by the doorbell 110 and analyzed by the authentication server 154 as further described below.

When a user performs an action on an IoT device requested by the authentication server 154, the IoT device can send to the authentication server 154 a second message that includes information corresponding to a second action performed by the user using the at least one device. The second action describes the action performed by the user on the IoT device in response to receiving the first message from the authentication server 154. An example of an information corresponding to a second action may include that a light bulb 104 has been turned on and then off. Another example of an information corresponding to a second action may include a picture or audio clip of a person sent via a camera (e.g., doorbell). In some embodiments, instead of receiving a second message from an IoT device, a customer service representative or a software installed on another server can monitor the action performed by the IoT device and can send the second message to the authentication server 154, where the second message indicates the second action performed by the IoT device.

When the authentication server 154 verifies that the second action is same as the first action, the authentication server 154 authenticate the user to perform the operation requested by the user. However, if the authentication server 154 determines that the second action is not the same as the first action, then the authentication server 154 can send a message to the user device where the message informs the user that he or she is not allowed to perform the requested operation.

In some embodiments, an authentication server 154 can perform biometric authentication by requesting, receiving, and analyzing biometric data from a user. For example, an authentication server 154 can send the first message requesting the user to provide a picture of the user or an audio clip of the user's voice. When the authentication server 154 receives from an IoT device a picture or audio clip, the authentication server 154 can analyze this information to determine whether the user requesting to perform an operation is a previously authorized user. For example, the authentication server 154 can authenticate the user to perform an operation requested by the user in response to the authentication server 154 determining that the second action performed by the user relates to or is the same as the first action (e.g., that a doorbell sent a picture or a home speaker 108 send an audio clip), and if the authentication server 154 determines that the received picture or audio clip (or characteristics of the biometric information thereof) matches a previously stored picture or audio clip (or characteristics thereof) of the user. A picture or audio clip matches a previous picture or audio clip if at least some of the features of the received picture or audio clip are the same as at least some of the features of the stored picture or audio clip. In some embodiments, a threshold or percentage match is required.

A second example authentication technique includes an authentication server 154 determining whether a person can perform an operation based on whether a person accurately identified an action performed by an IoT device, where the IoT device performs the action based on a command sent by the server. The second authentication technique includes the following operation as described above for the first authentication technique: an authentication server 154 receiving an indication of an operation requested by the user (as described above), the authentication server 154 retrieving a user profile associated with the user (as describe above), and the authentication server 154 determining, from the set of one or more IoT devices, at least one IoT device to authenticate the user.

Unlike the first authentication technique, the second authentication technique includes the authentication server 154 sending a command to the determined at least one IoT device to perform a first action. After the determined at least one IoT device performs the first action, a user is requested to identify the action performed by the at least one IoT device. Thus, the authentication server 154 sends to the user device a list of actions that includes the first action, where the list of action is sent with an instruction for the user to identify an action performed by the at least one device.

The authentication server 154 receives, from the user device, the action selected by the user from the plurality of actions. Thereafter, the authentication server 154 determine that the user is authenticated to perform the operation requested by the user if the authentication server 154 determines that the action selected by the user is the same as the first action. If the authentication server 154 determines that the action selected by the user is not the same as the first action, then the authentication server 154 can send a message to the user device where the message informs the user that he or she is not allowed to perform the requested operation. In some implementations, instead of selecting the action performed, the user inputs a response (e.g., "light turned on") or simply selects or types the IoT device that was accessed by the authentication server 154.

FIG. 2 shows an example flow diagram of the first authentication technique described in this patent document. At the receiving operation 202, a server (e.g., an authentication server 154) receives an indication of an operation requested by the user, where the indication is received via a user device associated with the user. At the retrieving operation 204, the server retrieves a user profile associated with the user, where the user profile includes a set of one or more devices registered with the user. At the determining operation 206, the server determines, from the set of one or more devices and after receiving the indication, at least one device to authenticate the user. In some embodiments, the user profile includes an accessibility record that indicate, for the set of one or more devices, a list of one or more actions available to authenticate the user.

At the sending operation 208, the server sends, to the user device, a first message to authenticate the user, where the first message instructs the user to perform a first action using the at least one device. In some embodiments, the first action includes turning on or off the at least one device, sending a command to the at least one device, increasing or decreasing a setting on the at least one device, or removing an item from the at least one device.

At the receiving operation 210, the server receives, from the at least one device, a second message that includes information corresponding to a second action performed by the user using the at least one device. At the verifying operation 212, the server verifies that the second action is same as the first action. At the determining operation 214, the server determines to authenticate the user to perform the operation requested by the user in response to the second action being same as the first action. Thus, at the determining operation 214, the server allows the user to perform the requested operation.

FIG. 3 shows an example flow diagram of the second authentication technique described in this patent document. At the receiving operation 302, a server (e.g., an authentication server 154) receives an indication of an operation requested by the user, where the indication is received via a user device associated with the user. At the retrieving operation 304, the server retrieves a user profile associated with the user, where the user profile includes a set of one or more devices registered with the user. At the determining operation 306, the server determines, from the set of one or more devices and after receiving the indication, at least one device to authenticate the user.

At the sending operation 308, the server sends, to the at least one device, a command to perform a first action. At the sending operation 310, the server sends, to the user device, a plurality of actions with an instruction for the user to identify an action performed by the at least one device, where the plurality of actions includes the first action. At the receiving operation 312, the server receives, from the user device, the action selected by the user from the plurality of actions. At the determining operation 314, the server determines that the user is authenticated to perform the operation requested by the user in response to determining that action selected by the user is the same as the first action.

Thus, at the determining operation 314, the server allows the user to perform the requested operation.

In example embodiment, the above-described methods are embodied in the form of processor-executable code and stored in a computer-readable program medium. Thus, a non-transitory machine-readable medium having machine executable instructions stored thereon that, when executed by one or more processors, direct the one or more processors to perform a method described in FIGS. 2 and/or 3, and/or in the various embodiments described in this patent document. In another example embodiment, a device that is configured or operable to perform the method(s) described in FIGS. 2 and/or 3, and/or in the various embodiments described in this patent document.

FIG. 4 is a block diagram illustrating an overview of devices on which some implementations of the disclosed technology can operate. The devices can comprise hardware components of a device 400, such as an authentication server, that manages an authentication platform 464. Device 400 can include one or more input devices 420 that provide input to the CPU (processor) 410, notifying it of actions. The actions are typically mediated by a hardware controller that interprets the signals received from the input device and communicates the information to the CPU 410 using a communication protocol. Input devices 420 include, for example, a mouse, a keyboard, a touchscreen, an infrared sensor, a touchpad, a wearable input device, a camera- or image-based input device, a microphone, or other user input devices.

CPU 410 can be a single processing unit or multiple processing units in a device or distributed across multiple devices. CPU 410 can be coupled to other hardware devices, for example, with the use of a bus, such as a PCI bus or SCSI bus. The CPU 410 can communicate with a hardware controller for devices, such as for a display 430. Display 430 can be used to display text and graphics. In some examples, display 430 provides graphical and textual visual feedback to a user (e.g., as described in the description associated with FIGS. 2 and 3). In some implementations, display 430 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 440 can also be coupled to the processor, such as a network card, video card, audio card, USB, FireWire or other external device, camera, printer, speakers, CD-ROM drive, DVD drive, disk drive, or Blu-Ray device.

In some implementations, the device 400 also includes a communication device capable of communicating wirelessly or wire-based with a network node. The communication device can communicate with another device or a server through a network using, for example, TCP/IP protocols. Device 400 can utilize the communication device to distribute operations across multiple network devices.

The CPU 410 can have access to a memory 450. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 450 can include program memory 460 that stores programs and software, such as an operating system 462, the authentication platform 464 that can perform the operations described in FIGS. 2 and/or 3, and the various operations associated with the authentication server. Thus, for example, the memory 450 may store instructions that upon execution by CPU 410 configure the device 400 to perform the operations described in FIGS. 2 and/or 3 and/or in the various embodiments described in this patent document. Memory 450 can also include data memory 470 that can include user profile retrieved by the authentication server, etc., which can be provided to the program memory 460 or any element of the device 400.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-4 described above, and in each of the flow diagrams, may be altered in a variety of ways. For example, the order of the logic may be rearranged, substeps may be performed in parallel, illustrated logic may be omitted, other logic may be included, etc. In some implementations, one or more of the components described above can execute one or more of the processes described above.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Several implementations of the disclosed technology are described above in reference to the figures. The computing devices on which the described technology may be implemented can include one or more central processing units, memory, input devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

We claim:

1. A method comprising:
receiving, via a user device associated with a user, an operation requested by the user for a premises;
accessing, in a user profile of the user, an accessibility record that indicates, for a plurality of user devices of the user, a list of one or more actions that can be performed using the user devices to authenticate the user;
determining a first action and a second action from the list of one or more actions to perform using one or more of the user devices based on a type of authentication required for the operation;
selecting at least one user device from the plurality of user devices based on the at least one user device being able to perform the first action and the second action, wherein the user device is different from the at least one user device;
sending, to the user device, a first message instructing the user to:
perform the first action with the at least one user device, and
perform the second action with the at least one user device, wherein the first action and the second action are performed in a predetermined order;
capturing, via a camera, image data of the first action and the second action occurring;
determining, based on the image data, the first action and the second action occurred in the predetermined order; and
in response to the first action and the second action occurring in the predetermined order, authenticating the user to perform the operation requested by the user.

2. The method of claim 1, further comprising:
receiving, from the user device, a second message that the user is unable to perform a third action based on a type of the third action.

3. The method of claim 1, wherein the first action and the second action are arranged in the predetermined order based on a level of interaction required by the user, wherein the at least one user device includes at least one of a light, a speaker, a thermostat, or a speaker.

4. The method of claim 1,
wherein the first action includes sending a picture of the user or sending an audio clip of a voice of the user, and
wherein the user is authenticated to perform the operation requested by the user in response to determining that the picture or the audio clip matches a previously stored picture or audio clip of the user.

5. The method of claim 1, further comprising:
in response to determining the second action is same as the first action, authenticating the user to perform the operation requested by the user.

6. The method of claim 1, wherein the first action includes turning on or off a first electronic device, sending a command to the first electronic device, or increasing or decreasing a setting on the first electronic device.

7. A system comprising:
one or more processors; and
one or more memories storing instructions that, when executed by the one or more processors, cause the system to perform a process comprising:
receiving, via a user device associated with a user, an operation requested by the user for a premises;
accessing, in a user profile of the user, an accessibility record that indicates, for a plurality of user devices of the user, a list of one or more actions that can be performed using the user devices to authenticate the user;
determining a first action and a second action from the list of one or more actions to perform using one or more of the user devices based on a type of authentication required for the operation;
selecting at least one user device from the plurality of user devices based on the at least one user device being able to perform the first action and the second action, wherein the user device is different from the at least one user device;
sending, to the user device, a first message instructing the user to:
perform the first action with the at least one user device, and
perform the second action with the at least one user device, wherein the first action and the second action are performed in a predetermined order;
capturing, via a camera, image data of the first action and the second action occurring;
determining, based on the image data, the first action and the second action occurred in the predetermined order; and
in response to the first action and the second action occurring in the predetermined order, authenticating the user to perform the operation requested by the user.

8. The system according to claim 7, wherein the process further comprises:
receiving, from the user device, a second message that the user is unable to perform a third action based on a type of the third action.

9. The system according to claim 7, wherein the first action and the second action are arranged in the predetermined order based on a level of interaction required by the user, wherein the at least one user device includes at least one of a light, a speaker, a thermostat, or a speaker.

10. The system according to claim 7,
wherein the first action includes sending a picture of the user or sending an audio clip of a voice of the user, and
wherein the user is authenticated to perform the operation requested by the user in response to determining that the picture or the audio clip matches a previously stored picture or audio clip of the user.

11. The system according to claim 7,
in response to determining the second action is same as the first action, authenticating the user to perform the operation requested by the user.

12. The system according to claim 7, wherein the first action includes turning on or off a first electronic device, sending a command to the first electronic device, or increasing or decreasing a setting on the first electronic device.

13. A non-transitory computer-readable medium storing instructions that, when executed by a computing system, cause the computing system to perform operations comprising:

receiving, via a user device associated with a user, an operation requested by the user for a premises;

accessing, in a user profile of the user, an accessibility record that indicates, for a plurality of user devices of the user, a list of one or more actions that can be performed using the user devices to authenticate the user;

determining a first action and a second action from the list of one more actions to perform using one or more of the user devices based on a type of authentication required for the operation;

selecting at least one user device from the plurality of user devices based on the at least one user device being able to perform the first action and the second action, wherein the user device is different from the at least one user device;

sending, to the user device, a first message instructing the user to:

perform the first action with the at least one user device, and perform the second action with the at least one user device, wherein the first action and the second action are performed in a predetermined order;

capturing, via a camera, image data of the first action and the second action occurring;

determining, based on the image data, the first action and the second action occurred in the predetermined order; and in response to the first action and the second action occurring in the predetermined order, authenticating the user to perform the operation requested by the user.

14

14. The non-transitory computer-readable medium of claim 13, wherein the operations further comprise:

receiving, from the user device, a second message that the user is unable to perform a third action based on a type of the third action.

15. The non-transitory computer-readable medium of claim 13, wherein the first action and the second action are arranged in the predetermined order based on a level of interaction required by the user, wherein the at least one user device includes at least one of a light, a speaker, a thermostat, or a speaker.

16. The non-transitory computer-readable medium of claim 13, wherein the first action includes sending a picture of the user at e e or sending an audio clip of a voice of the user, and wherein the user is authenticated to perform the operation requested by the user in response to determining that the picture or the audio clip matches a previously stored picture or audio clip of the user.

17. The non-transitory computer-readable medium of claim 13, wherein the first action includes turning on or off a first electronic device, sending a command to the first electronic device, or increasing or decreasing a setting on the first electronic device.

18. The non-transitory computer-readable medium of claim 13, wherein the operations further comprise:

in response to determining the second action is same as the first action, authenticating the user to perform the operation requested by the user.

* * * * *